No. 803,134. PATENTED OCT. 31, 1905.
J. B. RHODES.
FISH BAIT OR LURE.
APPLICATION FILED DEC. 5, 1904.

Witnesses: Inventor,
Jay B. Rhodes
By Chappell & Earl
Att'ys

UNITED STATES PATENT OFFICE.

JAY B. RHODES, OF KALAMAZOO, MICHIGAN.

FISH BAIT OR LURE.

No. 803,134. Specification of Letters Patent. Patented Oct. 31, 1905.

Application filed December 5, 1904. Serial No. 235,570.

*To all whom it may concern:*

Be it known that I, JAY B. RHODES, a citizen of the United States, residing at the city of Kalamazoo, county of Kalamazoo, State of Michigan, have invented certain new and useful Improvements in Fish Baits or Lures, of which the following is a specification.

This invention relates to improvements in fishing baits or lures.

The objects of this invention are, first, to provide an improved artificial bait or lure which shall strongly imitate a natural or live bait; second, to provide in a fish bait or lure an improved means for securing the hooks.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1:
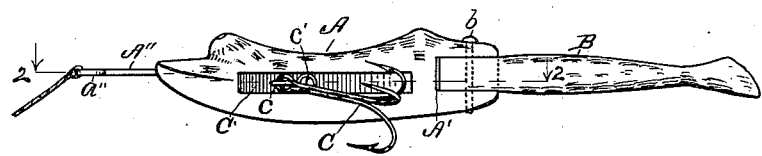
Figure 2:
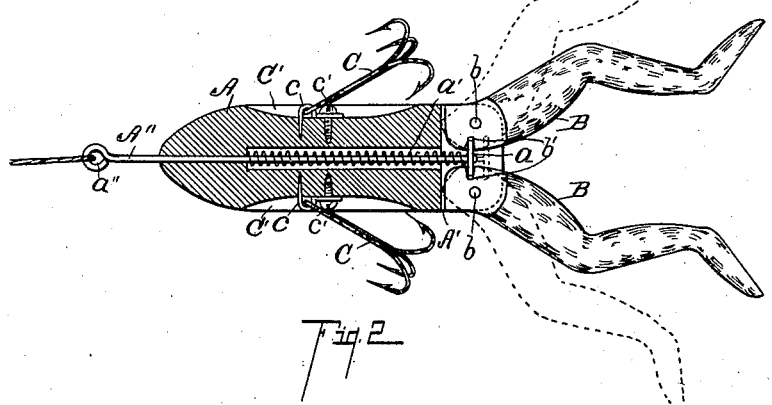

Figure 1 is a side elevation view of my improved artificial bait or lure. Fig. 2 is a longitudinal sectional view taken on a line corresponding to line 2 2 of Fig. 1 looking in the direction of the little arrows at the ends of the section-line, the legs B and the rod A" being shown in full lines and the outer position of the legs being indicated by dotted lines.

In the drawings similar letters of reference refer to similar parts in both views.

Referring to the drawings, the body A is preferably made in imitation of the body of a frog. In the rear end of the body A is a horizontally-arranged slot A', adapted to receive the forward ends of the legs B. The legs B are arranged in this slot and are pivotally secured to the body by the pivot-pins *b*. By thus securing the legs to the body they have a free lateral movement and at the same time are very strongly and simply secured.

A rod A" is slidably arranged through the body A. This rod is connected to the legs B by the cross-piece or head *a* on its rear end, which engages the notches *b'* in the inner edges of the legs, as clearly appears in Fig. 1, so that by the reciprocation of the rod the legs are moved. The rod A" is provided with an eye *a"* at its forward end, to which the fishing-line is secured. A coiled spring *a'* is arranged on the rod A", one end of the spring bearing against the head or cross-piece *a* and the other against the body A. This holds the rod normally rearward, thus throwing the legs normally outward, as shown by dotted lines in Fig. 2. When there is a pull on the line, the legs are drawn inward to the position illustrated in the drawings. When the line is again slackened, the legs are again thrown outward by the spring.

The hooks C are secured to the body A by the hook-shaped fasteners *c*, which engage the ends of the hooks. These fasteners are provided with eyes to receive the retaining-screws *c'*, the prongs of the hooks of the fasteners *c* entering suitable cavities or holes in the body, so that it is impossible to disengage the hook C until the fasteners are loosened by loosening the retaining-screws *c'* therefor. When it is desired to attach a hook, the screws *c'* are loosened until the eye of the hook may be slipped over the prong of the fastener-hook, and the detaining-screw is then tightened, drawing the prong of the fastener down into the body. Longitudinal grooves or kerfs C' are formed in the sides of the body A. The fasteners C are preferably arranged in these kerfs C' with their engaging portions pointing forwardly. This secures the hook so that its eye portion is held within the groove, thus making it impossible for the hooks secured on opposite sides of the body to become entangled with each other either above or below the body. The fasteners *c* are preferably secured by screws having round heads, as illustrated in the drawings, so that when the hooks are in their rearward position, as is illustrated, these heads form rests for the shanks of the hooks, holding them out in the most effective position to receive the strike of the fish.

My improved artificial bait or lure is very effective and may be caused to make a sufficient movement to attract the attention of the fish. It is very convenient to use and to manipulate. I have illustrated and described the same in detail in the form preferred by me, as the structure is very simple and economical. I am, however, aware that it is capable of very great structural variation without departing from my invention.

Having thus described my invention, what I claim as new, and desire to secure by Letters Patent, is—

1. In an artificial bait or lure, the combination of a body having a horizontally-arranged slot in its rear end; legs having notches in their inner edges toward their forward ends, arranged in said slot; vertically-arranged pivots for securing said legs to said body; a rod arranged longitudinally through said body and adapted to reciprocate therein; a spring adapted to hold said rod normally rearward; a head or cross-piece on said rod adapted to engage the notches in said legs; longitudinal grooves or kerfs in the sides of said body; hooks; hook-like fasteners for said hooks arranged in said grooves; and round-headed screws for retaining said fasteners, the heads of said screws being arranged to serve as bearings for the shanks of said hooks when said hooks are in their rearward positions, for the purpose specified.

2. In an artificial bait or lure, the combination of a body having a horizontally-arranged slot in its rear end; legs having notches in their inner edges toward their forward ends, arranged in said slot; vertically-arranged pivots for securing said legs to said body; a rod arranged longitudinally through said body and adapted to reciprocate therein; a spring adapted to hold said rod normally rearward; a head or cross-piece on said rod adapted to engage the notches in said legs; longitudinal grooves or kerfs in the sides of said body; hooks; hook-like fasteners for said hooks arranged in said grooves; and screws for retaining said fasteners, for the purpose specified.

3. In an artificial bait or lure, the combination of a body having a horizontally-arranged slot in its rear end; legs having notches in their inner edges toward their forward ends, arranged in said slot; vertically-arranged pivots for securing said legs to said body; a rod arranged longitudinally through said body and adapted to reciprocate therein; a spring arranged to hold said rod normally rearward; a head or cross-piece on said rod adapted to engage the notches in said legs; hooks; hook-like fasteners for said hooks; and round-headed screws for retaining said fasteners, the heads of said screws being arranged to serve as bearings for the shanks of said hooks when said hooks are in their rearward positions, for the purpose specified.

4. In an artificial bait or lure, the combination of a body having a horizontally-arranged slot in its rear end; legs having notches in their inner edges toward their forward ends, arranged in said slot; vertically-arranged pivots for securing said legs to said body; a rod arranged longitudinally through said body and adapted to reciprocate therein; a spring adapted to hold said rod normally rearward; a head or cross-piece on said rod adapted to engage the notches in said legs; hooks; hook-like fasteners for said hooks; and screws for retaining said fasteners, for the purpose specified.

5. In an artificial bait or lure, the combination of a body having a horizontally-arranged slot in its rear end; legs arranged in said slot; vertically-arranged pivots for securing said legs to said body; a rod arranged longitudinally through said body and adapted to reciprocate therein; connected to said legs; a spring adapted to hold said legs normally outward; longitudinal grooves or kerfs in the sides of said body; hooks; hook-like fasteners for said hooks arranged in said grooves; and round-headed screws for retaining said fasteners, the heads of said screws being arranged to serve as bearings for the shanks of said hooks when said hooks are in their rearward positions, for the purpose specified.

6. In an artificial bait or lure, the combination of a body having a horizontally-arranged slot in its rear end; legs arranged in said slot; vertically-arranged pivots for securing said legs to said body; a rod arranged longitudinally through said body and adapted to reciprocate therein, connected to said legs; a spring adapted to hold said legs normally outward; longitudinal grooves or kerfs in the sides of said body; hooks; hook-like fasteners for said hooks arranged in said grooves; and screws for retaining said fasteners, for the purpose specified.

7. In an artificial bait or lure, the combination of a body having a horizontally-arranged slot in its rear end; legs arranged in said slot; vertically-arranged pivots for securing said legs to said body; a rod arranged longitudinally through said body and adapted to reciprocate therein, connected to said legs; a spring adapted to hold said legs normally outward; hooks; hook-like fasteners for said hooks; and round-headed screws for retaining said fasteners, the heads of said screws being arranged to serve as bearings for the shanks of said hooks when said hooks are in their rearward positions, for the purpose specified.

8. In an artificial bait or lure, the combination of a body having a horizontally-arranged slot in its rear end; legs arranged in said slot; vertically-arranged pivots for securing said legs to said body; a rod arranged longitudinally through said body and adapted to reciprocate therein, connected to said legs; a spring adapted to hold said legs normally outward; hooks; hook-like fasteners for said hooks; and screws for retaining said fasteners, for the purpose specified.

9. In an artificial bait or lure, the combination of a body having a horizontally-arranged slot in its rear end; legs having notches in their inner edges toward their forward ends, arranged in said slot; vertically-arranged pivots for securing said legs to said body; a rod arranged longitudinally through said body and adapted to reciprocate therein; a spring adapted to hold said rod normally rearward; a head or cross-piece on said rod adapted to engage the notches in said legs; and suitable hooks carried by said body, for the purpose specified.

10. In an artificial bait or lure, the combination of a body having a horizontally-arranged slot in its rear end; legs arranged in said slots; vertically-arranged pivots for securing said legs to said body; a rod arranged longitudinally through said body and adapted to reciprocate therein, connected to said legs; a spring adapted to hold said legs normally outward; and suitable hooks, for the purpose specified.

11. In an artificial bait or lure, the combination of a body; legs; vertically-arranged pivots for securing said legs to said body; a rod arranged longitudinally through said body and adapted to reciprocate therein, connected to said legs; a spring adapted to hold said legs normally outward; and suitable hooks, for the purpose specified.

12. In an artificial bait or lure, the combination of a body; legs pivotally secured to said body; a rod, arranged longitudinally through said body and adapted to reciprocate therein, connected to said legs; a spring adapted to hold said legs normally outward; and suitable hooks, for the purpose specified.

13. In a bait or lure, the combination of a body; movable members therefor; a spring adapted to hold said movable members in one position; a fishing-line operatively connected to said movable members adapted to move them against the tension of the said springs; and suitable hooks, for the purpose specified.

14. In a bait or lure, the combination of a body; movable members therefor; a fishing line or cord operatively connected to said movable members whereby movement may be imparted to them; and suitable hooks, for the purpose specified.

15. In an artificial bait or lure, the combination of a body; longitudinal grooves or kerfs in the sides of said body; hooks; hook-like fasteners for said hooks arranged in said grooves, having eyes therein adapted to receive screws; and round-headed screws for retaining said fasteners, the heads of said screws being arranged to serve as bearings for the shanks of said hooks when said hooks are in their rearward positions, for the purpose specified.

16. In an artificial bait or lure, the combination of a body; longitudinal grooves or kerfs in the sides of said body; hooks; hook-like fasteners for said hooks arranged in said grooves, having eyes therein adapted to receive screws; and screws for retaining said fasteners, for the purpose specified.

17. In an artificial bait or lure, the combination of a body; hooks; hook-like fasteners for said hooks, having eyes therein adapted to receive screws; and round-headed screws for retaining said fasteners, the heads of said screws being arranged to serve as bearings for the shanks of said hooks when said hooks are in their rearward positions, for the purpose specified.

18. In an artificial bait or lure, the combination of a body; hooks; hook-like fasteners for said hooks, having eyes therein adapted to receive screws; and screws for retaining said fasteners, for the purpose specified.

19. In an artificial bait or lure, the combination of a body; a hook; a hook-like fastener adapted to engage the eye of said hook; and a screw for securing said fastener to said body, for the purpose specified.

In witness whereof I have hereunto set my hand and seal in presence of two witnesses.

JAY B. RHODES. [L. S.]

Witnesses:
OTTILIE C. FREIBERG,
E. A. GARDINER.